United States Patent
Ito et al.

(10) Patent No.: US 9,436,236 B2
(45) Date of Patent: Sep. 6, 2016

(54) INFORMATION PROCESSING DEVICE WITH SENSOR DETECTING MOVEMENT OF DEVICE HOUSING

(71) Applicant: Panasonic Corporation, Kadoma-shi, Osaka (JP)

(72) Inventors: Naoyuki Ito, Osaka (JP); Kentaro Hideshima, Osaka (JP); Shinya Sato, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 14/055,438

(22) Filed: Oct. 16, 2013

(65) Prior Publication Data

US 2014/0111935 A1 Apr. 24, 2014

(30) Foreign Application Priority Data

Oct. 23, 2012 (JP) ................................. 2012-233872
Oct. 7, 2013 (JP) ................................. 2013-210321

(51) Int. Cl.
*G06F 1/20* (2006.01)

(52) U.S. Cl.
CPC ................. *G06F 1/20* (2013.01); *G06F 1/203* (2013.01); *G06F 1/206* (2013.01)

(58) Field of Classification Search
CPC .......... G06F 1/20; G06F 1/203; G06F 1/206; G06F 1/3203; G06F 1/133385; H05K 7/20; H05K 7/20209; H05K 7/20136; H05K 7/20172; H05K 7/2019; G05D 23/1919; Y02B 60/1275; H01F 27/085

USPC .......... 700/300, 17; 713/300; 361/695, 691, 361/679.47, 679.46, 678, 690, 679.48
See application file for complete search history.

(56) References Cited

U.S. PATENT DOCUMENTS

| | | | | |
|---|---|---|---|---|
| 2004/0228091 | A1* | 11/2004 | Miyairi | H05K 7/20209 361/695 |
| 2005/0141127 | A1 | 6/2005 | Shimotono et al. | |
| 2006/0002081 | A1* | 1/2006 | Hongo | G06F 1/203 361/691 |
| 2006/0155424 | A1* | 7/2006 | Katoh | G05D 23/1919 700/300 |

(Continued)

FOREIGN PATENT DOCUMENTS

| | | |
|---|---|---|
| JP | 2002-259066 A | 9/2002 |
| JP | 2005-190641 A | 7/2005 |
| JP | 2007-172042 | 7/2007 |

(Continued)

*Primary Examiner* — Jerry Wu
*Assistant Examiner* — Stephen Sul
(74) *Attorney, Agent, or Firm* — Hamre, Schumann, Mueller & Larson, P.C.

(57) ABSTRACT

An information processing device includes a sensor section configured to detect a change in an attitude of a housing, a cooling fan configured to cool the housing, and a fan control circuit configured to control rotation of the cooling fan. When a change in the attitude of the housing has been detected by the sensor section, the fan control circuit stops the rotation of the cooling fan or decreases the number of rotation of the cooling fan to be lower than that in an ordinary operation. Thereafter, when a change in the attitude of the housing is no longer detected by the sensor section, the fan control circuit returns the rotation of the cooling fan to that in the ordinary operation.

6 Claims, 5 Drawing Sheets

(56) References Cited

U.S. PATENT DOCUMENTS

| | | | |
|---|---|---|---|
| 2007/0142976 A1* | 6/2007 | Tezuka | G05D 23/19 700/300 |
| 2008/0005594 A1* | 1/2008 | Adams | G06F 1/1616 713/300 |
| 2010/0049995 A1* | 2/2010 | Casey | G06F 1/206 713/300 |
| 2012/0245881 A1* | 9/2012 | Takaoka | B61L 25/025 702/128 |

FOREIGN PATENT DOCUMENTS

| | | |
|---|---|---|
| JP | 2012-094214 | 5/2012 |
| JP | 2014-042385 A | 3/2014 |

\* cited by examiner

INFORMATION PROCESSING DEVICE WITH SENSOR DETECTING MOVEMENT OF DEVICE HOUSING

BACKGROUND OF THE INVENTION

1. Field of the Invention

The present disclosure relates to an information processing device which appropriately control rotation of a fan for cooling or heat dissipation provided inside a housing.

2. Description of the Background Art

A personal computer has mounted therein components, such as a CPU (central processing unit) and a memory, which generate heat. In order to prevent influence of heat generated by such components onto computer operations, a fan for cooling the components that generate heat or a fan for discharging heat in the housing to the outside is provided in the personal computer. In the following description herein, a fan for cooling or heat dissipation will be generally referred to a "cooling fan".

With respect to control of such a cooling fan, various methods have been proposed. For example, Patent Literature 1 (Japanese Laid-Open Patent Publication No. 2012-094214) discloses a technology which detects vibration of a hard disk drive (HDD) inside a personal computer and stops rotation of a cooling fan when the magnitude of vibration of the HDD has become large. Accordingly, the technology of Patent Literature 1 prevents degradation of the performance of the HDD due to influence of vibration caused by rotation of the cooling fan.

Further, Patent Literature 2 (Japanese Laid-Open Patent Publication No. 2007-172042) discloses a technology which detects whether a personal computer is being used on a desk or on a lap, and increases the number of rotation of a cooling fan when the personal computer is being used on a lap. Accordingly, in the technology of Patent Literature 2, when the personal computer is used on a lap, the temperature of a heat generating part is suppressed by increasing the number of rotation of the cooling fan, and thus, an effect that the user is less likely to feel heat on his or her lap can be expected.

SUMMARY OF THE INVENTION

The present disclosure provides an information processing device which controls a rotation member such as a cooling fan to reduce abnormal sound or noise generated from the rotation member.

An information processing device according to the present disclosure includes a sensor configured to detect a change in an attitude of a housing, a rotation member such as a cooling fan, and a control section configured to control rotation of the rotation member. The control section performs control such that when a change in the attitude of the housing has been detected by the sensor, the control section stops the rotation of the rotation member or decreases the number of rotation of the rotation member to be lower than that in an ordinary operation, and thereafter, when a change in the attitude of the housing is no longer detected by the sensor, the control section returns the rotation of the rotation member to that in the ordinary operation.

The information processing device according to the present disclosure controls rotation of the rotation member such as a cooling fan, in accordance with a change in the attitude of the housing. Therefore, abnormal sound or noise generated from the rotation member can be reduced. Further, when there is no change in the attitude of the housing any longer, the information processing device according to the present disclosure returns the rotation of the rotation member to that in the ordinary operation before the control. Therefore, cooling performance relative to components that generate heat can be maintained.

These and other objects, features, aspects, and advantages of the present disclosure will become more apparent from the following detailed description of the present disclosure when taken in conjunction with the accompanying drawings.

DESCRIPTION OF THE PREFERRED EMBODIMENTS

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Hereinafter, one embodiment will be described with reference to FIG. 1 to FIG. 6.

[1. Structure]

Figure 1:
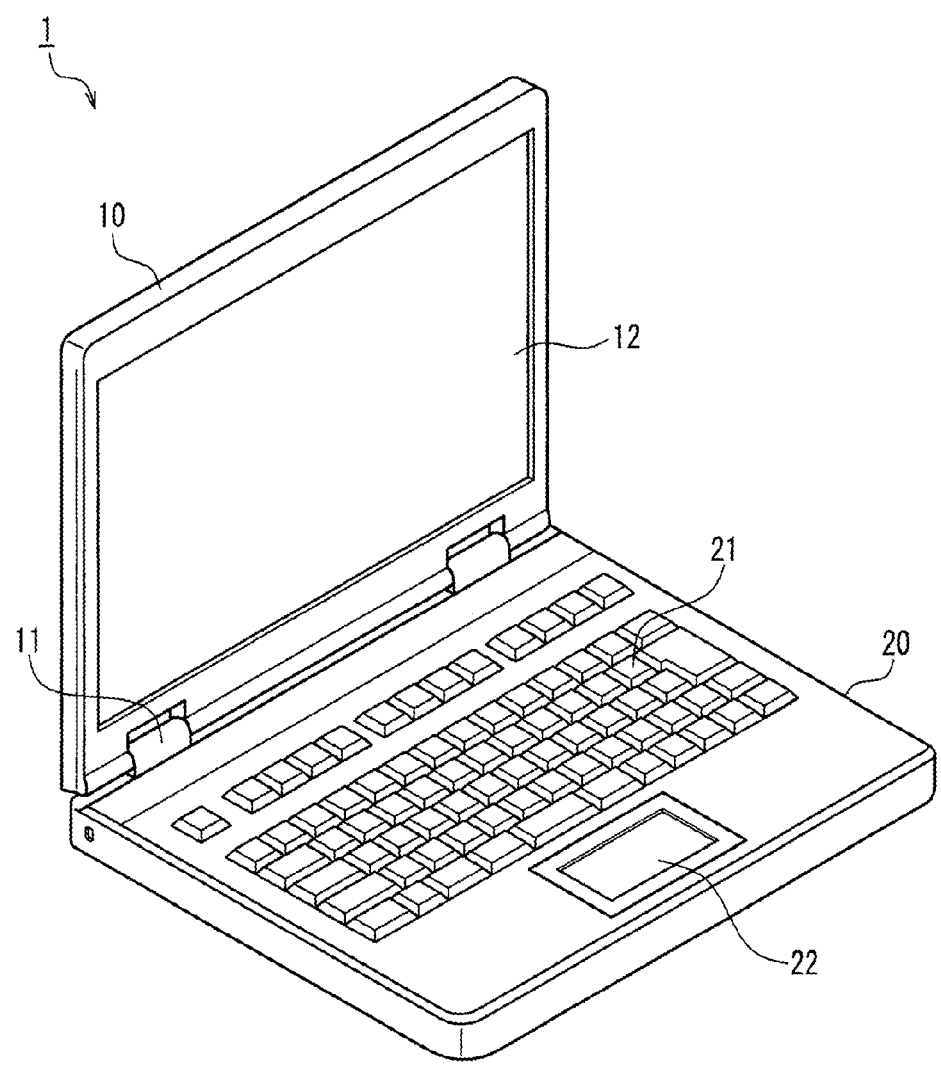
FIG. 1 shows an external view of an information processing device 1 according to one embodiment.

FIG. 1 shows an external view of an information processing device 1 according to one embodiment. FIG. 1 illustrates a notebook personal computer as the information processing device 1. However, the shape and the size of the information processing device 1 to which the present disclosure is applied are not limited in particular, as long as the information processing device 1 is an apparatus provided with a cooling fan, and the information processing device 1 may be a tablet-type personal computer, for example.

The information processing device 1 shown in FIG. 1 includes a display unit 10 and a body unit 20, and the display unit 10 is attached to the body unit 20 by means of a hinge part 11 so as to be able to be opened and closed. A front face (the side facing the body unit 20 in a closed state) of the display unit 10 is provided with a display screen 12, such as a liquid crystal display or an organic EL display. An upper face (the side facing the display unit 10 in the closed state) of the body unit 20 is provided with a character input section 21 such as a keyboard, a pointing device 22 such as a touch-pad, and the like. Although not shown in particular, operation buttons such as a power switch and the like, a microphone and a speaker, medium inlets for a DVD (digital versatile disk), a memory card, and the like, connection terminals such as an USB (universal serial bus) and the like are installed as appropriate in the upper face and side faces of the body unit 20 in accordance with the specification of the information processing device 1.

Figure 2:
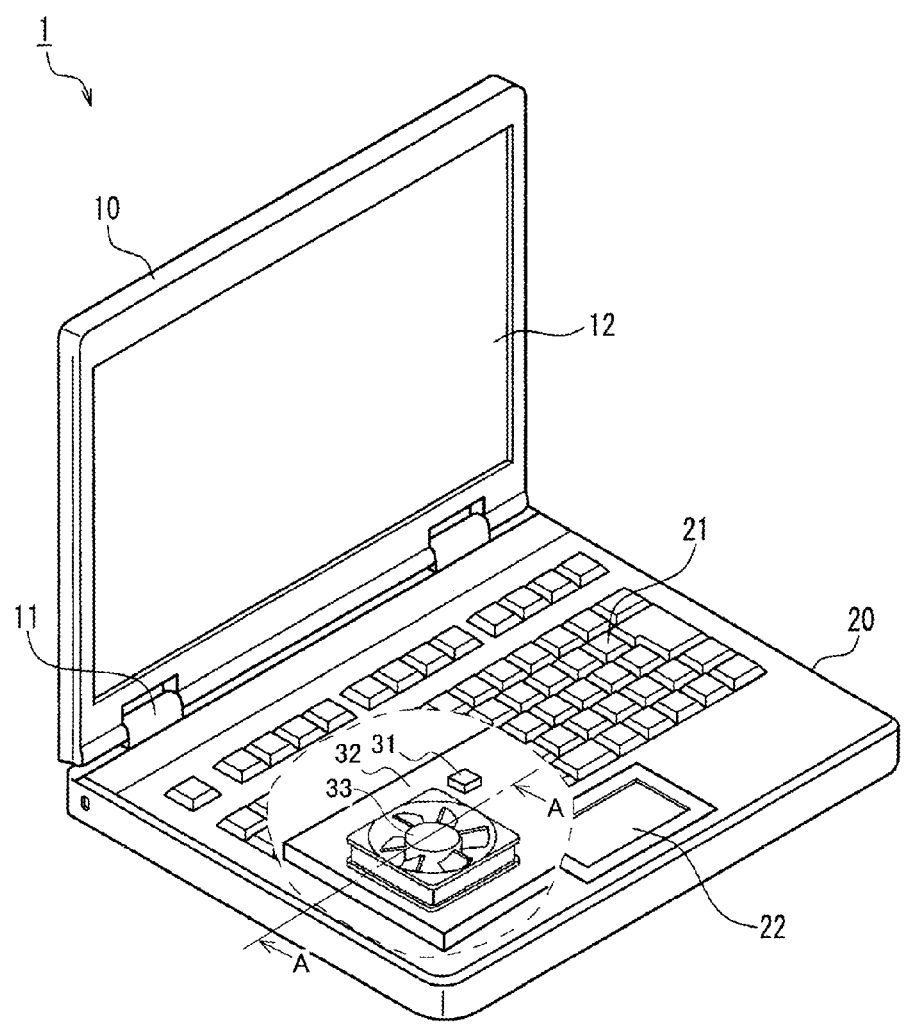
FIG. 2 shows an example of a part of the inner structure of a body unit 20 of the information processing device 1 shown in FIG. 1, seen through the upper face of the body unit 20.

The display unit 10 has a substantially rectangular parallelepiped box shape, and as shown in FIG. 2, a sensor section 31, an electronic circuit board 32, a cooling fan 33, a hard disk drive (not shown), a medium drive section (not shown) such as a DVD drive, and the like are housed in the interior under the character input section 21 and the pointing device 22. FIG. 2 shows an example of a part of the inner structure of the body unit 20 of the information processing device 1 shown in FIG. 1, seen through the upper face of the body unit 20. It should be noted that the inner structure of the body unit 20 shown in FIG. 2 is merely an example and the arrangement of components housed therein is not limited thereto.

Figure 3:
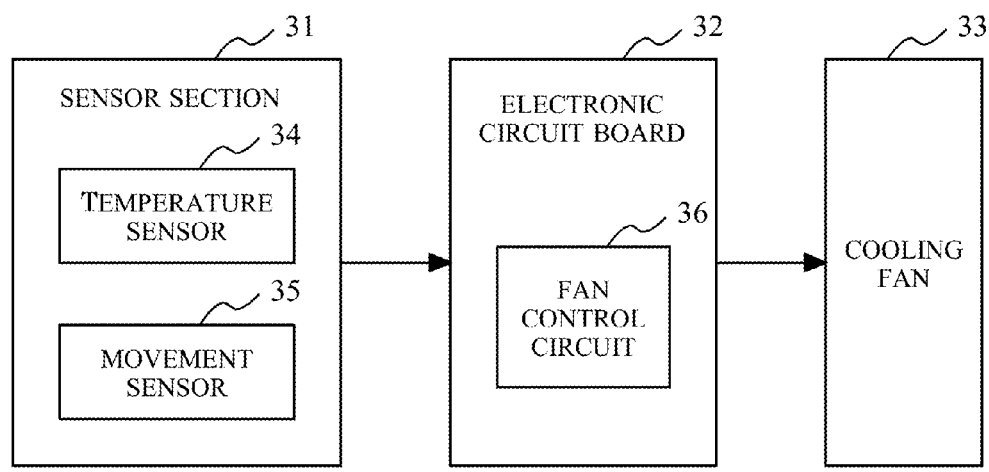
FIG. 3 is a functional block diagram showing characteristic configurations, in the present disclosure, among functional components housed in a display unit 10 of the information processing device 1.

FIG. 3 is a functional block diagram showing connection among the sensor section 31, the electronic circuit board 32, and the cooling fan 33, which are main functional components, in the present disclosure, housed in the body unit 20 of the information processing device 1.

The sensor section 31 includes a temperature sensor 34 which detects a temperature inside the body unit 20, and a movement sensor 35 which detects movement such as an inclination or a rotation of the information processing device 1 (housing). As the movement sensor 35, an angular velocity sensor, an acceleration sensor, a geomagnetic sensor, and/or the like is used for example. A result (angular velocity, acceleration, geomagnetism, and/or the like) detected by the sensor section 31 is sent to the electronic circuit board 32. On the electronic circuit board 32, various components and circuits for causing the information processing device 1 to function as a computer, and a fan control circuit 36 which controls the cooling fan 33 in accordance with a content detected by the sensor section 31 are mounted. The fan control circuit 36 controls rotation of the cooling fan 33 in accordance with a content detected by the movement sensor 35. For example, the fan control circuit 36 increases the rotation speed of the cooling fan 33 if a temperature detected by the temperature sensor 34 is high, and decreases the rotation speed of the cooling fan 33 when a temperature detected by the temperature sensor 34 is low. In addition, the fan control circuit 36 performs characteristic control of the cooling fan 33 described later, in accordance with a detection value of the movement sensor 35. The cooling fan 33 is a fan for cooling components (CPU, for example) that generate heat associated with operation of the information processing device 1. FIG. 2 shows an example in which the components to be cooled are arranged below the cooling fan 33.

[2. Operation]

Next, a specific fan controlling method performed by the information processing device 1 having the above structure according to an embodiment will be described.

Before describing the specific fan controlling method, relationship between movement of the information processing device 1 and the cooling fan 33 found by the inventors of the present application will be described.

Typically, a stationary desktop personal computer is often used at a fixed position (in a static state) such as on a desk. Thus, a cooling fan can continue rotating stably and silently. However, in the case of a portable personal computer such as a notebook personal computer or a tablet personal computer, movement such as lifting, inclining, or rotating the portable personal computer in various directions may occur during operation thereof. When such movement has occurred, abnormal sound or noise may be generated from the cooling fan.

Thus, generation of abnormal sound or noise from the cooling fan has been considered as follows.

Figure 4:
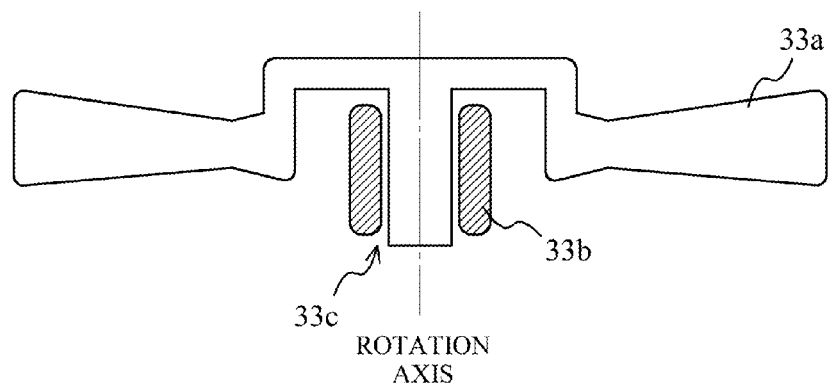
FIG. 4 shows a simplified view of a rotational structure part viewed in an A-A cross section of a cooling fan 33 shown in FIG. 2.

FIG. 4 shows a simplified view of a rotational structure part viewed in an A-A cross section of the cooling fan 33 shown in FIG. 2. As shown in FIG. 4, the cooling fan 33 of the present embodiment has a structure in which a shaft 33a of the fan is inserted into a shaft bearing part 33b having a cylindrical shape such that the fan is rotatable about a rotation axis. A gap 33c between the shaft 33a and the shaft bearing part 33b is filled with a lubricant material (not shown), such as oil, having a small friction coefficient, and the shaft bearing part 33b supports the shaft 33a so as to be able to rotate.

Figure 5:
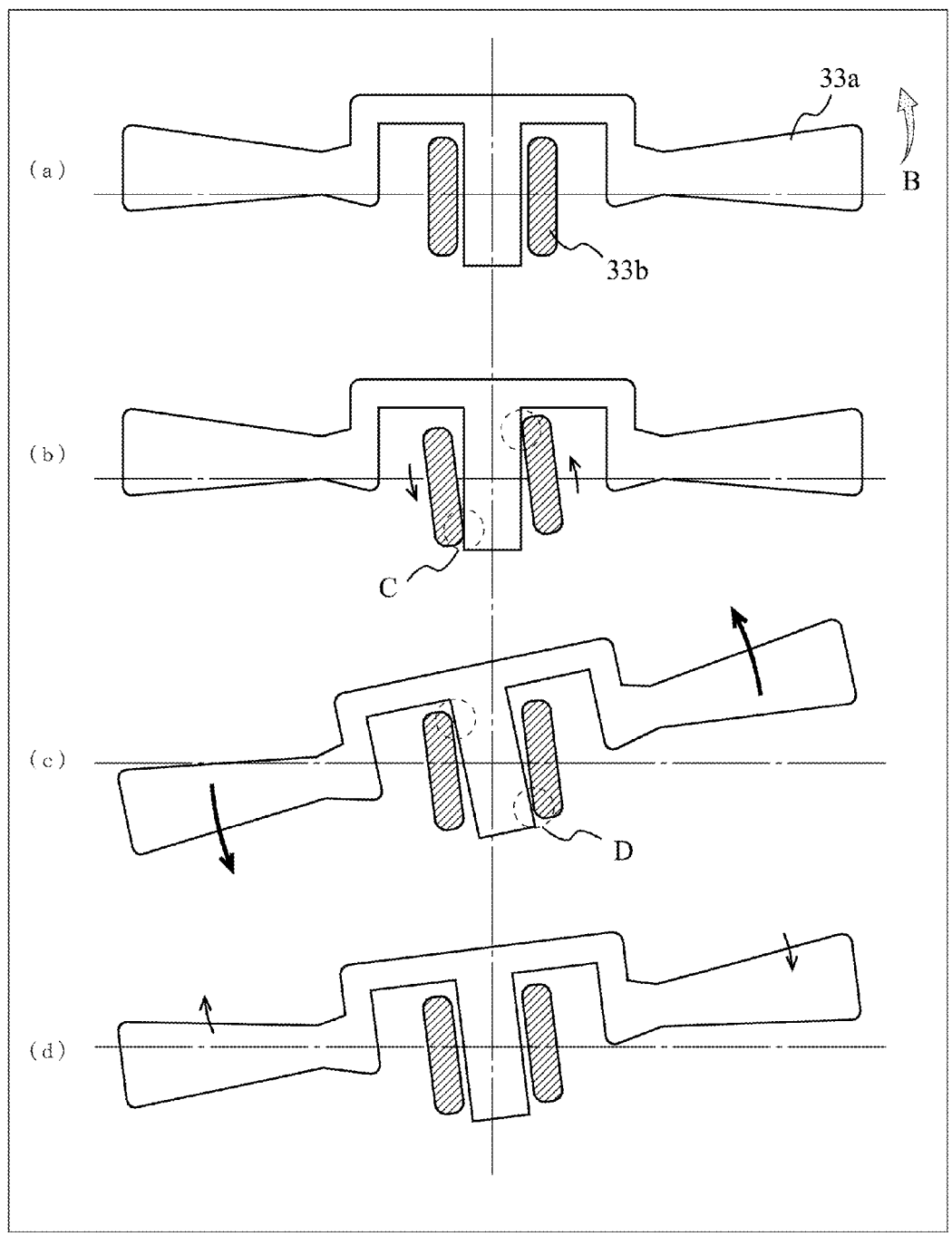
FIG. 5 illustrates how the state of the cooling fan 33 changes associated with movement of the information processing device 1.

Now, a case of inclining the information processing device 1 in which the cooling fan 33 is horizontally rotating, to a direction indicated by an arrow B ((a) of FIG. 5) is considered. In this case, since the shaft bearing part 33b of the cooling fan 33 is physically fixed to the information processing device 1 (housing), the shaft bearing part 33b will be inclined by the same angle of the inclination of the information processing device 1. In contrast to this, the shaft 33a of the cooling fan 33 is in a state where the shaft 33a is indirectly fixed via the lubricant material to the shaft bearing part 33b, that is, to the information processing device 1. Therefore, the shaft 33a may not be able to follow the movement of the information processing device 1, and thus may come into contact with the shaft bearing part 33b at a portion C ((b) of FIG. 5), or may come into contact with the shaft bearing part 33b at a portion D as a result of being inclined by the inclination or more of the information processing device 1 ((c) of FIG. 5). The contact between the rotating shaft 33a and the shaft bearing part 33b causes rotational friction between the shaft 33a and the shaft bearing part 33b, and thus causing generation of abnormal sound or noise. Which of (b) of FIG. 5 and (c) of FIG. 5 occurs depends on the speed and the angle of inclination of the information processing device 1.

It should be noted that when movement of the information processing device 1 has stopped and the state of the information processing device 1 is maintained, even if the information processing device 1 is in an inclined state, the shaft 33a returns to the center position of the shaft bearing part 33b through the rotational operation of the shaft 33a ((d) of FIG. 5). Therefore, the contact between the shaft 33a and the shaft bearing part 33b is canceled and abnormal sound or noise is no longer generated.

Based on the findings described above, the inventors of the present application newly found that abnormal sound or noise generated when the shaft 33a comes into contact with the shaft bearing part 33b can be reduced by appropriately controlling rotation of the cooling fan 33 when the information processing device 1 has been moved, and have devised a fan controlling method described below.

Figure 6:
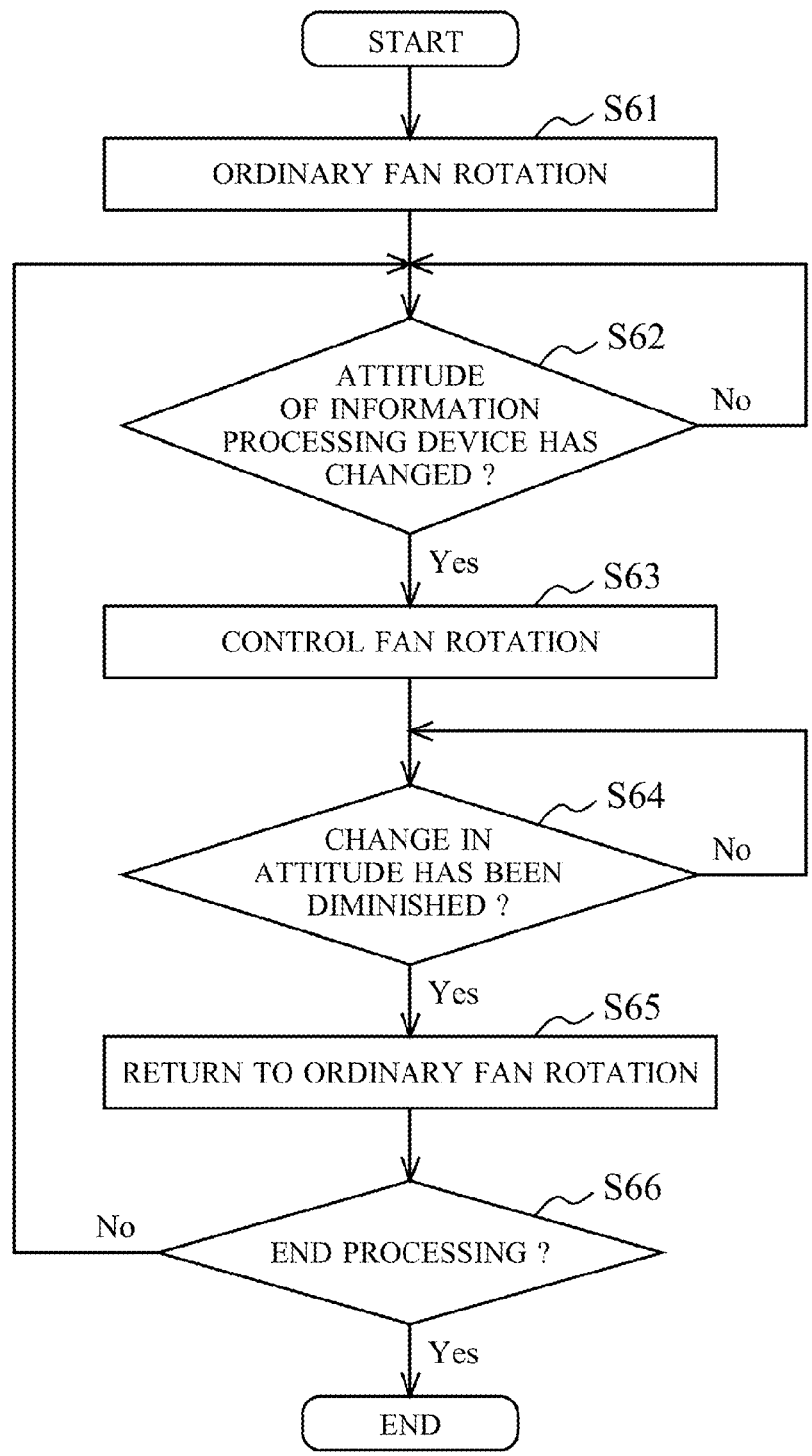
FIG. 6 is a flow chart showing process steps of a fan controlling method performed by a fan control circuit 36 of the information processing device 1.

FIG. 6 is a flow chart showing process steps of the fan controlling method performed by the fan control circuit 36 of the information processing device 1 according to an embodiment.

With reference to FIG. 6, when the information processing device 1 is in a static state and the cooling fan 33 is ordinarily rotating (step S61), the fan control circuit 36 determines whether movement of the information processing device 1 has been detected by the sensor section 31 (step S62). The "movement" here does not refer to presence/absence of an inclination angle of the information processing device 1 relative to the horizontal direction, but refers to a change from the immediately preceding direction and inclination of the information processing device 1 to the current direction and inclination of the information processing device 1, in other words, presence/absence of "a change in the attitude" of the information processing device 1. This is because, as described with reference to (d) of FIG. 5, even when the information processing device 1 is in an inclined state, if movement is stopped, no abnormal sound or noise is generated. Therefore, in the present fan controlling method, whether a change has occurred in the attitude of the information processing device 1 is detected by use of the movement sensor 35 of the sensor section 31. For example, in a case where the movement sensor 35 is an angular velocity sensor, if an angular velocity has been detected by the angular velocity sensor, it is determined that a change has occurred in the attitude of the information processing device 1.

Here, contact between the shaft 33a and the shaft bearing part 33b not always occurs when a change has occurred in the attitude of the information processing device 1. That is, whether contact between the shaft 33a and the shaft bearing part 33b occurs depends on the speed and the direction of moving the information processing device 1, and on the viscosity and the amount of the lubricant material filling the gap 33c between the shaft 33a and the shaft bearing part 33b. Even when the information processing device 1 has been moved, if a force that causes the shaft 33a to reach the shaft bearing part 33b through the lubricant material is not generated (if the lubricant material has a capability of retaining the shaft), contact between the shaft 33a and the shaft bearing part 33b does not occur. Further, the direction in which the information processing device 1 has been moved is the direction of the rotation axis (the central axis of the shaft 33a) of the cooling fan 33, contact between the shaft 33a and the shaft bearing part 33b does not occur. Still further, the direction in which the information processing device 1 has been moved is a direction perpendicular to the rotation axis (the central axis of the shaft 33a) of the cooling fan 33, the entirety of the lubricant material supports the movement of the shaft 33a, and thus, compared with the case of (b) of FIG. 5, contact between the shaft 33a and the shaft bearing part 33b is less likely to occur.

Therefore, in step S62, whether a change has occurred in the attitude of the information processing device 1 may be detected, by setting a predetermined threshold value regarding the speed of movement, and by determining whether a value detected by the movement sensor 35 exceeds the threshold value. For example, in a case where the movement sensor 35 is an angular velocity sensor, a predetermined angular velocity is set as a threshold value. Then, if an angular velocity detected by the angular velocity sensor has become greater than or equal to the threshold value, it is determined that a change has occurred in the attitude of the information processing device 1. With respect to the direction of the movement, directions that are to be excluded from the detection target (for example, a direction of the rotation axis of the cooling fan 33 and a direction perpendicular to the rotation axis of the cooling fan 33) are set in advance, and whether there has been movement of the information processing device 1 may be detected only based on the detection target.

In step S62, when a change in the attitude of the information processing device 1 has been detected (step S62: Yes), the fan control circuit 36 performs control of stopping rotation of the cooling fan 33 or decreasing the rotation speed thereof (reduce the number of rotation) (step S63).

As described above, contact between the shaft 33a and the shaft bearing part 33b associated with movement of the information processing device 1 is not avoidable basically. The problem here is that friction is caused due to rotation of the shaft 33a being in contact with the shaft bearing part 33b. Thus, in the present fan controlling method, when a change in the attitude, of the information processing device 1, that may bring the shaft 33a into contact with the shaft bearing part 33b has been detected, control is performed such that rotation of the cooling fan 33 is stopped before such contact occurs or the rotation speed of the cooling fan 33 is decreased to a speed at which abnormal sound or noise due to friction can be tolerated. It should be noted that when rotation of the cooling fan 33 is to be stopped, taking into consideration that the rotation will continue for a while due to inertia even after power supply to the cooling fan 33 is cut, the rotation may be stopped a little earlier, or instantly stopped with a brake mechanism provided, for example.

After the control of stopping the rotation of the cooling fan 33 or decreasing the rotation speed has been performed in step S63, the fan control circuit 36 determines whether the change in the attitude of the information processing device 1 has diminished (the movement has become movement that would no longer cause contact between the shaft 33a and the shaft bearing part 33b) (steps S64 and S65). Here, the change in the attitude of the information processing device 1 can be detected by use of the movement sensor 35. For example, in a case where the movement sensor 35 is an angular velocity sensor, a predetermined angular velocity is set as a threshold value, and if an angular velocity detected by the angular velocity sensor has become lower than the threshold value, it is determined that there is no change in the attitude of the information processing device 1 any longer (the movement has become movement that would no longer cause contact between the shaft 33a and the shaft bearing part 33b). Then, when having determined that the change in the attitude of the information processing device 1 has diminished (step S64: Yes), the fan control circuit 36 returns the rotation of the cooling fan 33 to that in the ordinary operation before the control (step S65).

It should be noted that in step S64, instead of using the technique of detecting whether the change in the attitude of the information processing device 1 has diminished and automatically returning the rotation state to the original state, whether the change in the attitude of the information processing device 1 has diminished may be detected by determining a lapse of a predetermined time period. The reason why rotation of the cooling fan 33 is automatically returned to the original rotation after a lapse of a predetermined time period is that, in a several seconds after the movement has begun, the information processing device 1 is expected to have settled in some place and to be in a static state.

In this case, if the threshold value set in step S62 is made different from the threshold value set in step S64, thereby causing the determination of a change in the attitude to be made based on hysteresis, it is possible to avoid an undesirable situation in which the number of rotation of the cooling fan 33 is frequently switched due to a change in the attitude around a threshold value, whereby a stable fan control can be performed.

The processes of step S62 to S65 are repeated until receiving an explicit instruction to end the fan control, such as turning off the power of the information processing device 1 (step S66).

[3. Effects]

As described above, according to the present embodiment, control is performed such that if there is a change in the attitude of the information processing device 1, rotation of the cooling fan 33 is stopped, or the rotation speed of the cooling fan 33 is decreased. Accordingly, the shaft 33a of the cooling fan 33 is prevented from coming into contact with the shaft bearing part 33b. Even if such contact has occurred, abnormal sound or noise due to friction can be reduced to a tolerable level.

Further, according to the present embodiment, after a lapse of a predetermined time period or when there is no change in the attitude of the information processing device 1 any longer, rotation of the cooling fan 33 is returned to that in the ordinary operation before the control. Accordingly, cooling performance relative to components that generate heat can be maintained.

Other Embodiments

In the embodiment, a notebook personal computer has been described as an example of the information processing device 1. However, the information processing device 1 may be any apparatus whose attitude may be changed. Therefore, the information processing device 1 is not limited to a notebook personal computer, and may be a tablet personal computer or the like which does not have the hinge part 11, for example.

Further, in the embodiment, a fan which cools components that generate heat has been described as an example of the cooling fan 33. However, the cooling fan 33 may be any fan that cools the information processing device (housing). Therefore, the cooling fan 33 is not limited to that for cooling components, and may be a circulation fan or the like for discharging heat in an information processing device (housing) to the outside, for example.

Further, other than a fan, any component that has a rotation member composed of the shaft bearing part 33b and the shaft 33a as shown in FIG. 4 can be applied also to a hard disk drive, an optical disc drive, or the like, for example. This is because a structure in which a shaft which rotates a hard disk or an optical disc is supported by a shaft bearing part via a lubricant material could cause abnormal sound or noise due to rotational friction. In this case, by performing control similar to that in the flow described with reference to FIG. 6, similar effects can be obtained.

In an embodiment, when a change in the attitude of the information processing device (housing) has been detected, an operation of causing the head of the hard disk to recede may be performed. When an impact is applied to a hard disk, the disk may be damaged due to contact between the head and the disk. Thus, before an impact is applied, the head is caused to recede in order to prevent damage of the disk.

For example, when the information processing device 1 is dropped while being carried by a person or collides with something, an impact is applied to the hard disk and the disk may be damaged. Here, when the information processing device 1 is dropped or collides with something, the attitude of the information processing device 1 changes before the drop or collision happens. For example, when the information processing device 1 is dropped, the attitude of the information processing device 1 changes at the time when the information processing device 1 has left the hands of the user, and then falls. When the information processing device 1 collides with something, the information processing device 1 moves toward something, and after the attitude thereof has changed, collision happens. Therefore, by performing an operation of causing the head to recede at the time point when a change in the attitude of the information processing device 1 has been detected, the head can be caused to recede before the hard disk receives an impact, and thus, damage of the disk can be prevented.

As presented above, one embodiment has been described as an example of the technology according to the present disclosure. For this purpose, the accompanying drawings and the detailed description are provided.

Therefore, components in the accompanying drawings and the detailed description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

The present disclosure can be applied to an information processing device which includes, inside the housing thereof, a fan for cooling, heat dissipation, or the like. Specifically, the present disclosure can be applied to a notebook personal computer, a tablet personal computer, or the like.

While one embodiment of the present disclosure has been described in detail, the foregoing description is in all aspects illustrative and not restrictive. It will be understood that numerous other modifications and variations can be devised without departing from the scope of the disclosure.

What is claimed is:

1. An information processing device comprising:
   a sensor configured to detect a change in an attitude of a housing;
   a rotation member comprising a shaft;
   a support for the rotation member; wherein the rotation member is a cooling fan configured to cool the housing; and
   a control section configured to control the rotation of the rotation member, wherein
   the control section is configured to perform control such that, when the sensor detects that the attitude of the housing is changing, the control section stops the rotation of the rotation member or decreases the rate of rotation of the rotation member to be lower than that in an ordinary operation to suppress contact or friction between the rotation member and the support that may occur due to temporary misalignment of the rotation member and the support, and thereafter, when the sensor no longer detects that the attitude of the housing is changing, and an original alignment of the rotation member and the support is present, the control section returns the rate of the rotation of the rotation member to that in the ordinary operation.

2. The information processing device according to claim 1, wherein the sensor includes at least one of an angular velocity sensor, an acceleration sensor, and a geomagnetic sensor.

3. The information processing device according to claim 1, wherein the control section performs control such that, when a value detected by the sensor has become greater than or equal to a first threshold value, the control section stops the rotation of the rotation member or decreases the rate of rotation of the rotation member to be lower than that of the ordinary operation, and thereafter, when a value detected by the sensor has become less than a second threshold value, the control section returns the rate of the rotation of the rotation member to that of the ordinary operation.

4. The information processing device according to claim 3, wherein the first threshold value and the second threshold value are set to values different from each other.

5. The information processing device according to claim 1, wherein the sensor detects the changing attitude of the housing based on movement of the housing in a direction other than a direction of a rotation axis of the rotation member and a direction perpendicular to the rotation axis of the rotation member.

6. The information processing device according to claim 1, wherein when the sensor no longer detects that the attitude of the housing is changing even if the housing is in an inclined state, the control section returns the rate of the rotation of the rotation member to that of the ordinary operation.

* * * * *